United States Patent [19]

Mamyshev

[11] Patent Number: 5,432,631
[45] Date of Patent: Jul. 11, 1995

[54] DUAL-WAVELENGTH SOURCE OF HIGH-REPETITION RATE, TRANSFORM-LIMITED OPTICAL PULSES

[75] Inventor: Pavel V. Mamyshev, Middletown, N.J.

[73] Assignee: AT&T Corp., Murray Hill, N.J.

[21] Appl. No.: 223,915

[22] Filed: Apr. 6, 1994

[51] Int. Cl.$^6$ .......................................... H04B 10/04
[52] U.S. Cl. .................................. 359/183; 359/154; 359/279; 372/3
[58] Field of Search ............... 359/154, 129, 183, 279, 359/327, 334; 372/3, 28

[56] References Cited

U.S. PATENT DOCUMENTS

| | | | |
|---|---|---|---|
| 3,873,825 | 3/1975 | Jones et al. | 359/129 |
| 5,227,908 | 7/1993 | Henmi | 359/154 |

OTHER PUBLICATIONS

"Active Mode-Locking Characteristics of InGaAsP-Single Mode Fiber Composite Cavity Lasers", G. Eisenstein et al., IEEE Journal of Quantum Electronics, vol. QE-22, No. 1, Jan. 1986, pp. 142-148.
"Actively Mode-Locked Semiconductor Lasers", J. E. Bowers et al., IEEE Journal of Quantum Electronics, vol. 25, No. 6, Jun. 1989, pp. 1426-1439.
"40 GHz Active Mode-Locking In A 1.5 mu m Monolithic Extended-Cavity Laser", G. Eisenstein et al., Electronics Letters, vol. 25, No. 10, May 11, 1989, pp. 621-622.
"Transform-limited pulse generation in the gigahertz region from a gain-switched distributed-feedback laser diode using spectral windowing", M. Nakazawa et al., Opt. Lett., vol. 15, Jun. 15, 1990, pp. 715-717.
"Transform-limited 1.4 ps optical pulses from a monolithic colliding-pulse mode-locked quantum well laser", M. C. Wu et al., Appl. Phys. Lett., 57(8), 20 Aug. 1990, pp. 759-761.
"Generation of Fundamental Soliton Trains for High-Bit-Rate Optical Fiber Communication Lines", P. V. Mamyshev et al., IEEE Journal of Quantum Electronics, vol. 27, No. 10, Oct. 1991, pp. 2347-2355.
"5.5-mm Long InGaAsP Monolithic Extended-Cavity Laser with a Integrated Bragg-Reflector for Active Mode $\propto$ Locking", P. B. Hansen et al., IEEE Photonics Technology Letters, vol. 4, No. 3, Mar. 1992, pp. 215-217.
"Harmonically mode-locked fiber ring laser with an internal Fabry-Perot stabilizer for soliton transmission", G. T. Harvey et al., Optics Letters, Jan. 15, 1993, vol. 18, No. 2, pp. 107-109.
"Optical Properties of Photosensitive Fiber Phase Grating", V. Mizrahi et al., IEEE J. Lightwave Technology, vol. 11, No. 10, Oct. 1993, pp. 1513-1517.
"Transform-Limited Optical Generation up to 20 GHz Repetition Rate by a Sinusoidally Driven InGaAsP Electroabsorption Modulator", M. Suzuki et al., Journal of Lightwave Technology, vol. 11, No. 3, Mar. 1993, pp. 468-473.

Primary Examiner—Leslie Pascal
Assistant Examiner—Kinfe-Michael Negash
Attorney, Agent, or Firm—Stuart H. Mayer

[57] ABSTRACT

A method and apparatus for producing high quality optical pulse trains at a high repetition rate first phase modulates a cw optical signal with an external phase modulator. The central optical frequencies (i.e., the carrier frequency and at least one pair of sidebands) of the phase modulated signal are then removed from the signal. Each of the remaining side-bands that have not been removed independently form an optical pulse train of the desired transform-limited pulses.

10 Claims, 7 Drawing Sheets

FIG. 1

FIG. 2A PHASE $\phi(t)$
NORMALIZED TIME, t/T

FIG. 2B FREQUENCY DEVIATION $\omega_0$ $\delta\omega(t)$

FIG. 2C ANTI-STOKES PULSE TRAIN

FIG. 2D STOKES PULSE TRAIN
NORMALIZED TIME, t/T

10 GHz/div  ↑$\omega_0$

FIG. 7B 20 psec/div

DUAL-WAVELENGTH SOURCE OF HIGH-REPETITION RATE, TRANSFORM-LIMITED OPTICAL PULSES

FIELD OF THE INVENTION

This invention relates to a method and apparatus for producing an optical pulse train. More particularly, this invention relates to a method and apparatus for producing optical pulses that are nearly transform-limited which have a sech-like shape.

BACKGROUND

Numerous methods are known for generating optical pulse trains at a high-repetition rate in which the pulses are nearly transform-limited and have a sech-like shape. Such optical pulses are important, for example, in soliton transmission systems.

For example, M. Nakazawa, S. Suzuki, Y. Kimura, *Opt. Lett.* 15, 715 (1990) disclose optical pulse sources that employ gain-switched, output-filtered, distributed feedback (DFB) lasers. However, these lasers suffer from extreme chirp and excessive timing jitter. Mode-locked semiconductor lasers using external cavities have also been employed as optical pulse sources and are disclosed, for example, in the following references: G. Eisenstein, R. S. Tucker, U. Koren an S. Korotky, *IEEE J. Quantum Electronics* 22, 142 (1986); J. E. Bowers, P. A. Morton, A. Mar and S. W. Corzine, *IEEE J. Quantum Electronics*, 25, 1426 (1989); R. S. Tucker et al., *Electron. Lett.* 25, 621 (1989); M. C. Wu et al., *Appl. Phys. Lett.* 57, 759 (1990); and P. B. Hansen et al., *IEEE Phot. Technol. Lett.* 4, 215 (1992). These sources tend to be difficult to align, have low output power, and are generally expensive to implement in a practical manner.

Other known sources of optical pulses having the abovementioned characteristics include harmonically mode-locked, modulator-driven, fiber ring lasers. These sources, which require servo-control of the ring length, also tend to be expensive and suffer from modulator bias drift. An example of such a source is disclosed in G. T. Harvey and L. F. Mollenauer, *Opt. Lett.* 18, 107 (1993). Other sources, such as disclosed in M. Suzuki, H. Tanaka, N. Edagawa, K. Utaka, Y. Matsushima, *J. Lightwave Technol.* 11, 468 (1993), employ an intensity modulator to carve the pulses from a cw source. However, these sources also tend to suffer from modulator bias drift. Finally, some sources employ dual-frequency laser signals which undergo a nonlinear transformation into the desired pulse trains. However, for repetition rates less than 20 GMZ, these sources typically require that the pulse-forming fiber have an impractically long length. An example of such a source is disclosed in P. V. Mamyshev, S. V. Chernikiov and E. M. Dianov, *IEEE J. Quantum Electron.* QE-27 (2347 (1991).

It is, therefore, an object of this invention to provide a simple and relatively inexpensive method and apparatus for generating high quality pulse trains at a high repetition rate while at the same time avoiding the above-enumerated deficiencies.

SUMMARY

This object is achieved by a method and apparatus in which a cw optical signal is phase modulated by an external phase modulator. The central optical frequencies (i.e., the carrier frequency and at least one pain, of sidebands) of the phase modulated signal are then removed from the signal. Each of the remaining sidebands that have not been removed independently form an optical pulse train of the desired transform-limited pulses. Accordingly, this example of the invention forms a dual-wavelength source of high quality pulses that can form, for example, adjacent channels in a wavelength-division-multiplexed (WDM) communication system.

In another example of this invention, the initial cw optical signal is phase modulated as above. At least one of the Stokes or anti-Stokes components of the modulated optical signal is then selected. This selected component defines at least one optical pulse train composed of the desired high quality pulses.

This invention avoids the deficiencies of known pulse sources discussed above. For example, this invention requires no modulator bias setting since only the phase is directly modulated, not the intensity. Accordingly, the problem of modulator drift is eliminated.

DETAILED DESCRIPTION

Figure 1:
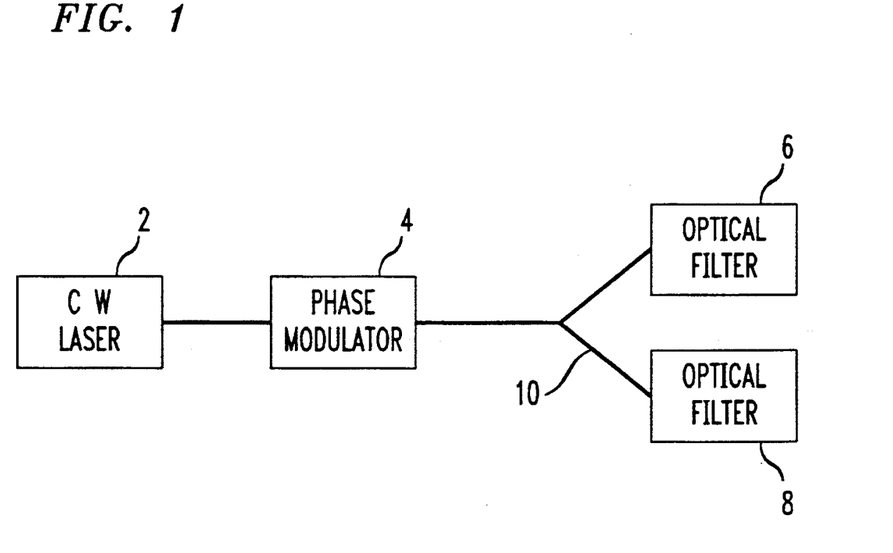
FIG. 1 shows a block diagram of one example of an optical source for generating high quality optical pulses in accordance with this invention.

FIG. 1 shows a block diagram of an optical source for generating high quality optical pulses at a high repetition rate in accordance with this invention. A cw laser 2 is optically coupled to a phase modulator 4. The phase modulator 4 imparts phase modulation to the cw signal from the laser 2. The phase modulator 4 is in turn optically coupled to two optical filters 6 and 8 so that a portion of the signal from the phase modulator 4 is directed to each of the filters 6 and 8. The optical coupling between the phase modulator 4 and the optical filters 6 and 8 may be accomplished, for example, with a Y-branch coupler 10.

The principles upon which the optical source of this invention operates are as follows. The cw signal from the laser 2 is phase modulated by the modulator 4 so that its instantaneous phase is modulated in a periodic manner. While the periodicity may be chosen as desired, for illustrative purposes the periodicity will be assumed to be sinusoidal. Accordingly, the instantaneous phase of the modulated signal is:

$$\Phi(t) = A\sin(\Omega t) + \Phi_0 \quad (1)$$

where $\Omega$ is the modulation frequency and A is the modulation amplitude. As a result of the modulation, the instantaneous optical frequency of the modulated signal, $\omega(t)$, also changes with time. The optical frequency deviation is defined as:

$$\delta\omega(t) \equiv \omega(t) - \omega_0$$

where $\omega_0$ is the initial frequency of the cw signal. Therefore:

$$\delta\omega(t) = \frac{\partial \Phi}{\partial t} = A\Omega\cos(\Omega t) \quad (2)$$

Figure 2A:
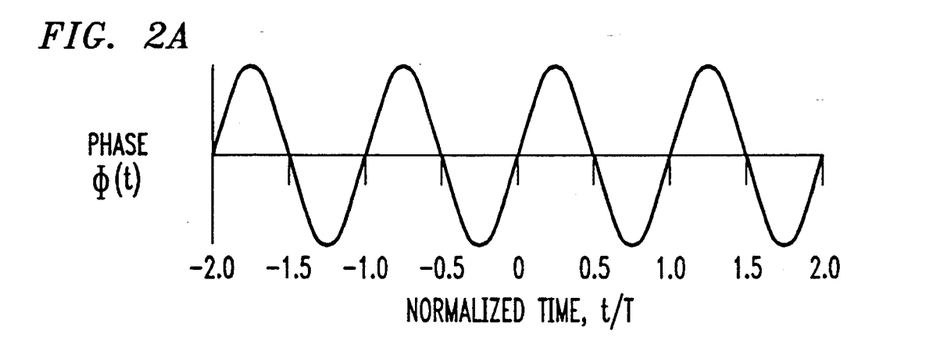
FIG. 2(a) shows a graph of the external phase modulation of an optical cw signal as a function of time.
Figure 2B:
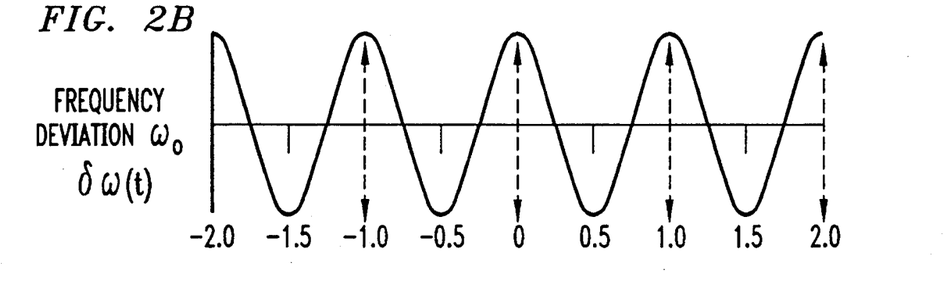
FIG. 2(b) shows a graph of the instantaneous frequency deviation of the phase modulated cw signal.

FIG. 1(a) shows the phase modulation of the cw signal produced by the modulator 4 as a function of time while FIG. 1(b) shows the frequency deviation $\delta\omega(t)$ as a function of time. As FIG. 1 indicates, the signal frequency chirp is zero (i.e., $\partial(\delta\omega(t))/\partial t = 0$) at those times (i.e., $t = T \times n/2$, where $n = 0, +-1, +-2 \ldots$ and $T = 2\pi/\Omega$), when the carrier frequency deviation $|\delta\omega(t)|$ reaches its maximum value. Those frequency regions for which the frequency deviation reach a maxima are indicated by the horizontal dashed lines in FIG. 1(b). These regions define the extreme anti-Stokes (i.e., the uppermost line) and Stokes (i.e., the lowermost lines) spectral components of the phase modulated cw signal.

Figure 2C:
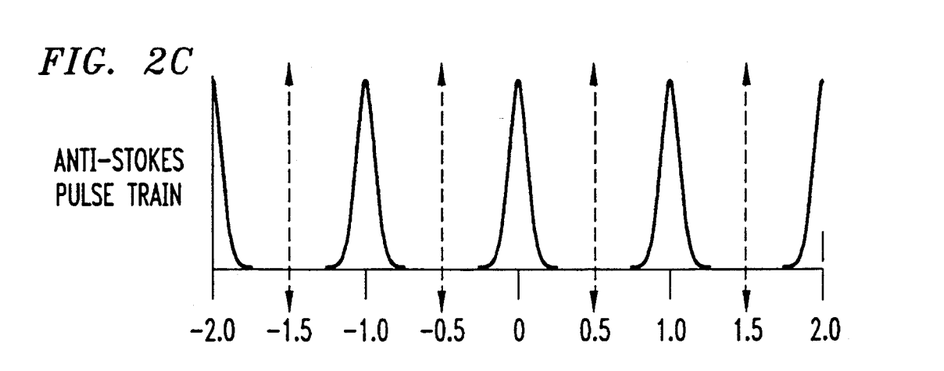
FIG. 2(c) and 2(d), respectively, show the anti-Stokes and Stokes spectral components of the phase modulated cw signal which each form an optical pulse train in accordance with this invention.
Figure 2D:
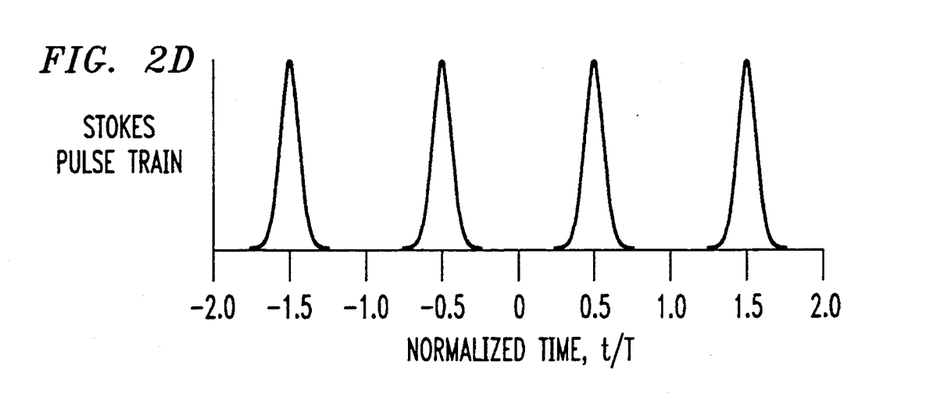

In accordance with this invention, the optical filters 6 and 8 are configured to select, respectively, the extreme Stokes and anti-Stokes spectral components of the phase modulated cw signal. Each of these components define a pulse train that forms the desired high quality, high repetition-rate pulses. The two pulse trains selected by the optical filters 6 and 8 are shown in FIGS. 2(c) and 2(d). Thus, as FIGS. 2(c) and 2(d) illustrate, nearly transform-limited (i.e., chirp-free) pulses can be obtained at the corresponding wavelength at a repetition rate $R = 1/T$ determined by the phase modulation frequency.

An important advantage achieved by this invention is that the generation of the pulse train is independent of the constant phase bias $\Phi_0$ (see equations 1 and 2). Thus, this optical pulse source is insensitive to any drift of the phase bias which is inherent in most known practical modulators.

Figure 3A:
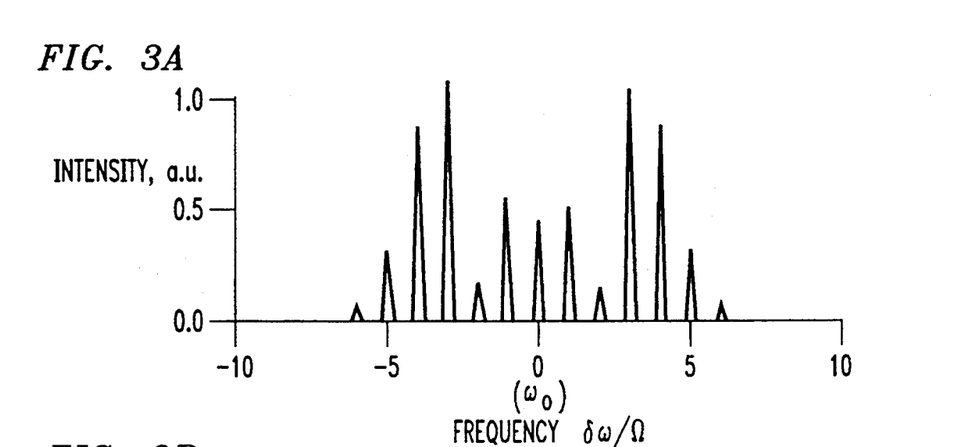
FIG. 3(a) shows an example of the spectral components of the phase modulated cw signal as a function of the frequency deviation relative to the unmodulated cw signal.
Figure 3B:
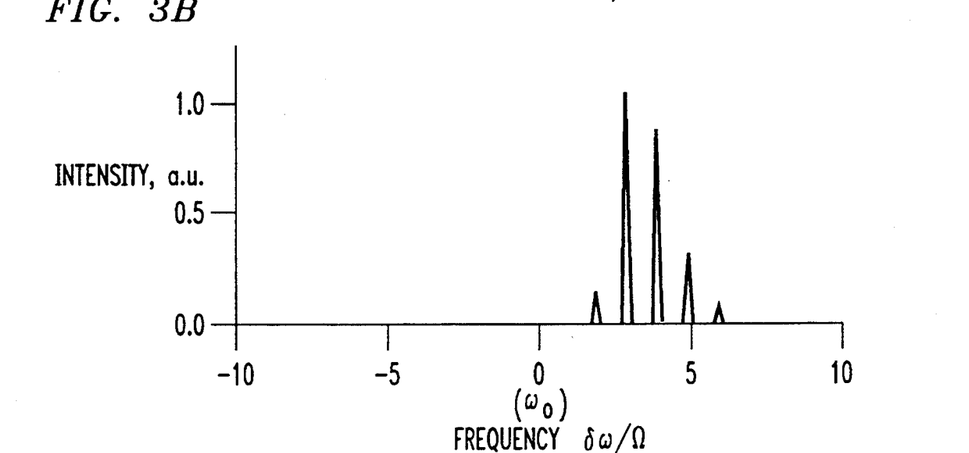
FIGS. 3(b) and 3(c) show, respectively, the anti-Stokes and Stokes components of the signal after passing through the optical filters.
Figure 3C:
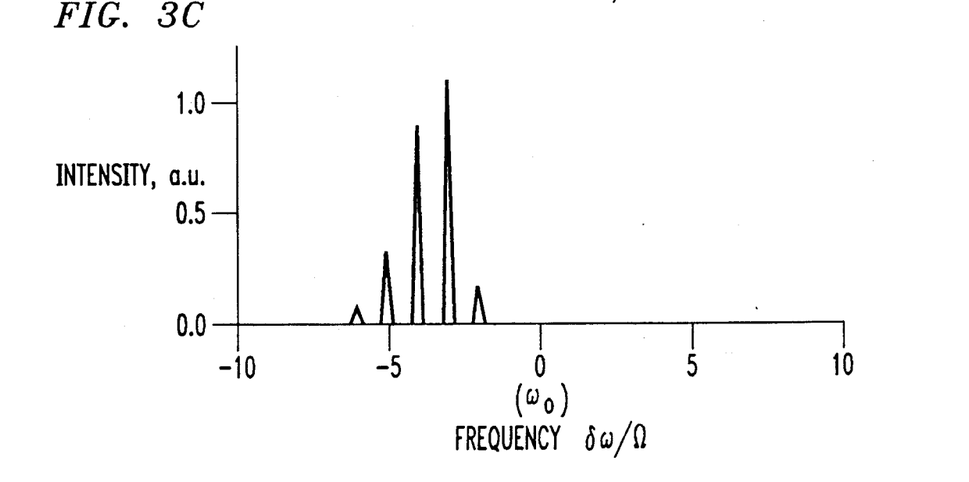

Additional features of this invention will be illustrated with the use of numerical simulations. FIGS. 3-5 show simulated pulses and pulse trains when the cw laser signal is phase modulated in accordance with Eq. (1) with the phase modulation A equal to $1.5\pi$. In particular, FIG. 2(a) shows the spectrum as a function of the frequency deviation $\delta\omega(t)$ (where $\delta\omega(t) = 0$ is the frequency of the unmodulated cw signal) after the cw signal has undergone phase modulation but before it has been filtered by the filters 6 and 8. FIGS. 3(b) and 3(c) show, respectively, the anti-Stokes and Stokes components of the signal after it passes through the optical filters 6 and 8. As a comparison of FIG. 3(a) with FIGS. 3(b) and 3(c) reveals, in this example the filters 6 and 8 remove the carrier frequency and the pair of sidebands nearest to the carrier frequency. However, the actual number of sidebands removed from the modulated signal is designer-selectable and depends on the particular application for which the pulses are to be employed.

Figure 4A:
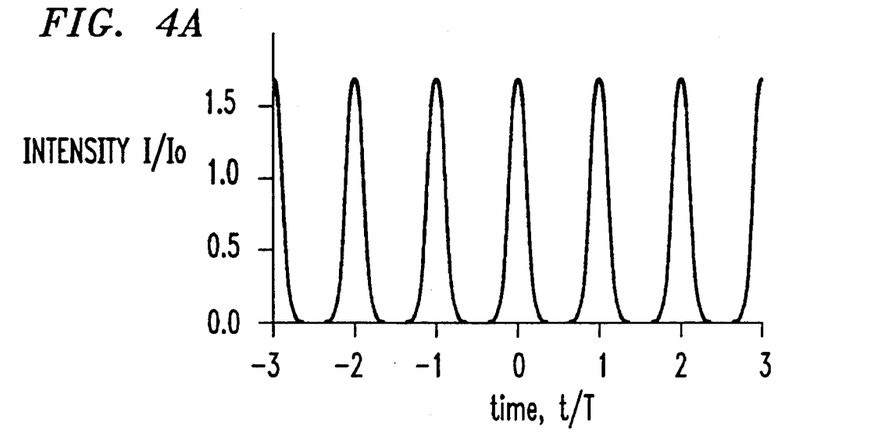
FIGS. 4(a) and 4(b) show the pulse trains corresponding to the spectral components shown in FIGS. 3(a) and 3(b), respectively.
Figure 4B:
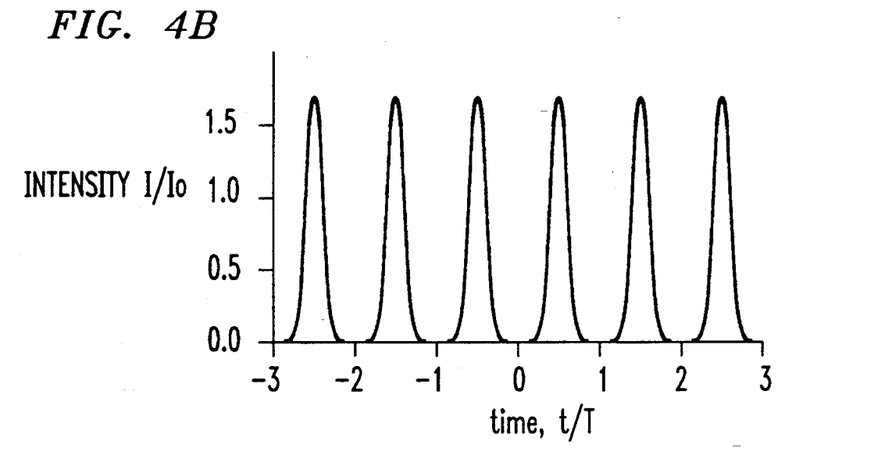
Figure 4C:
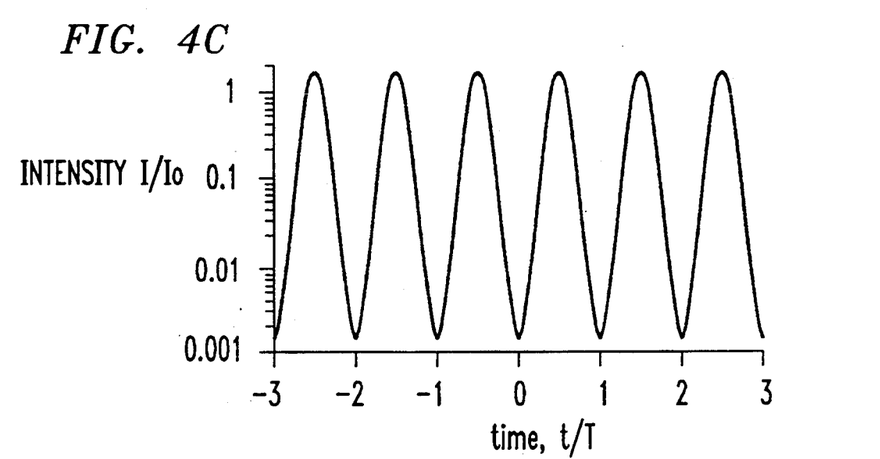
FIG. 4(c) shops the pulse train of FIG. 4(b) on a logarithmic scale.
Figure 5:
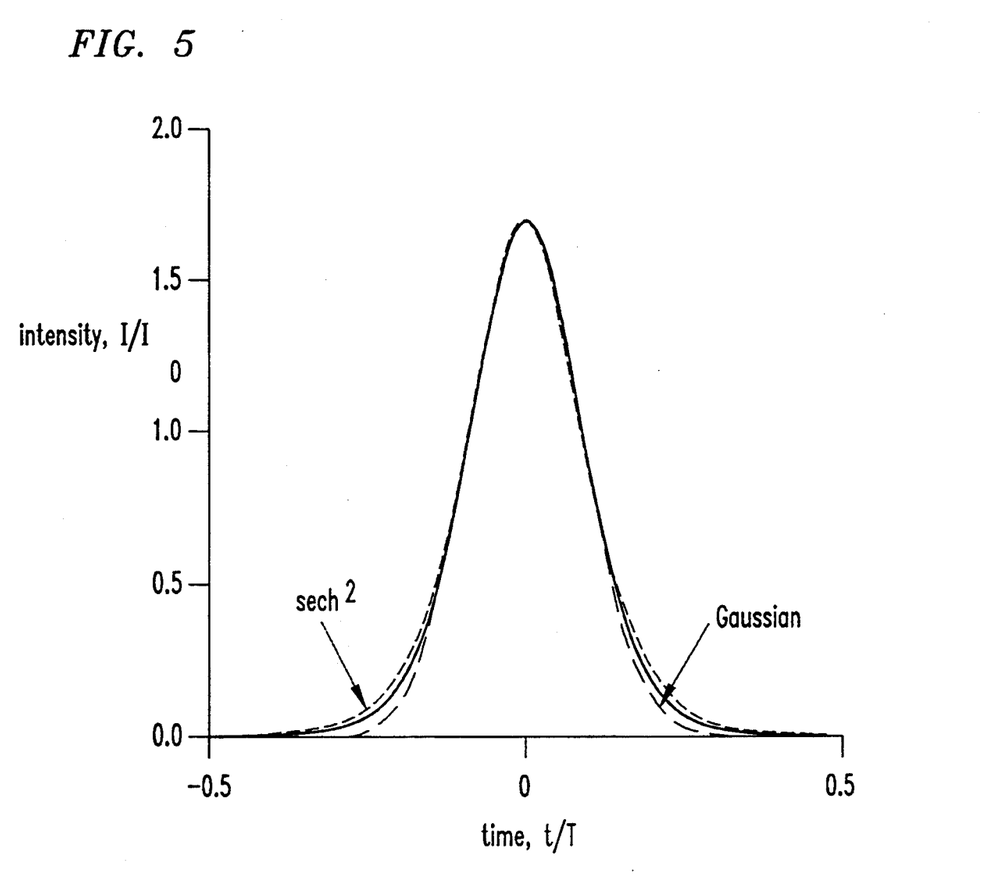
FIG. 5 shows an expanded view of one of the pulses seen in FIG. 4(c).

FIGS. 4(a) and (b) show the pulse trains corresponding to the spectral components shown in FIGS. 3(a) and (b), respectively. FIG. 4(c) shows the pulse train of FIG. 4(b) on a logarithmic scale normalized to the input cw signal intensity $I_0$. FIG. 5 shows an expanded view of one of the pulses seen in FIG. 3(c). As this Figure illustrates, the shape of the pulses generated by this invention is between $sech^2$ and Gaussian. In view of this fact, it is not surprising that the time-bandwidth product is 0.39.

Figure 6:
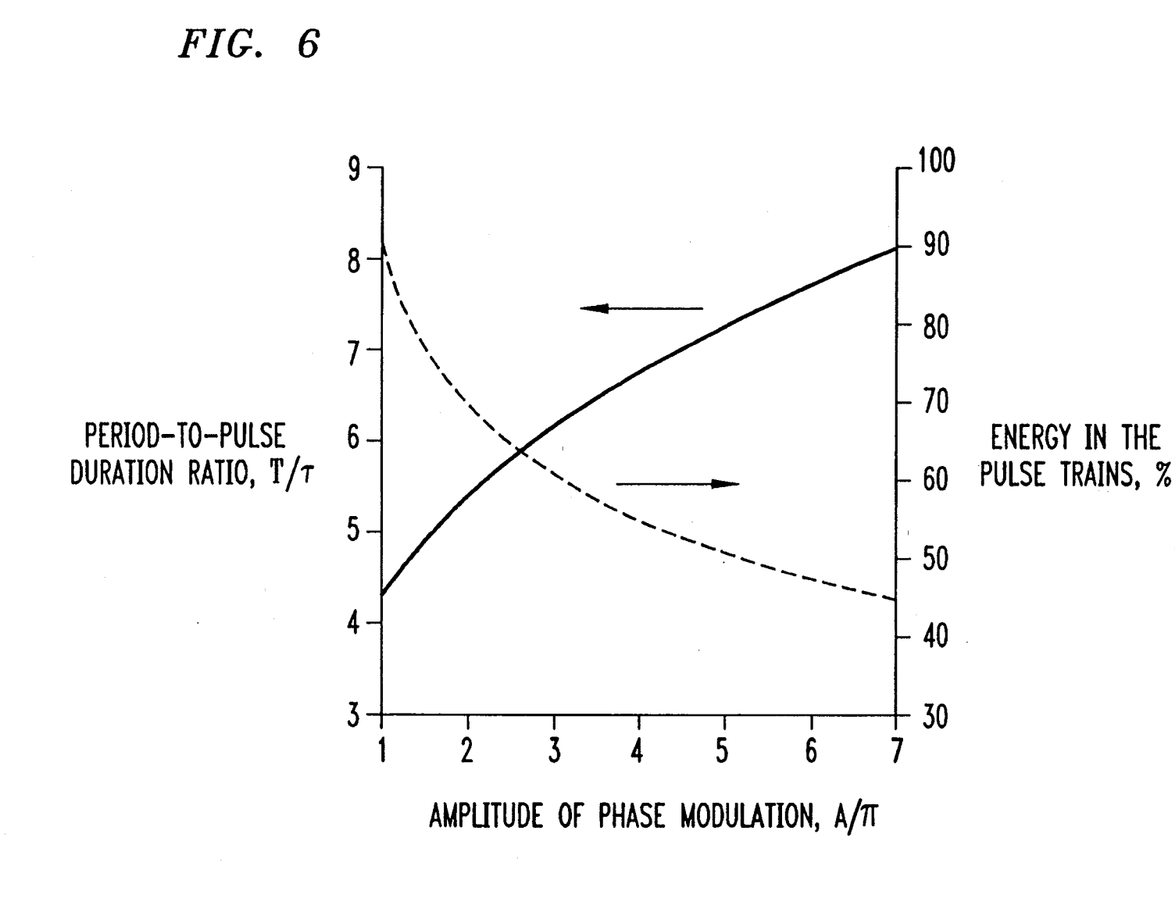
FIG. 6 shows an example of the calculated ratio T/τ, where τ is the pulse width (FWHM) (solid curve) and the energy contained in both the Stokes and anti-Stokes pulse trains (dashed curve), both as a function of the phase modulation amplitude A.

FIG. 6 (solid curve) shows the calculated ratio $T/\tau$, where $\tau$ is the pulse width (FWHM) as a function of the phase modulation amplitude A. As the curve indicates, the pulse width decreases as the phase modulation amplitude A increases. In particular, the ratio $T/\tau$ increases from 4.3 to 8.1 as A increases from $\pi$ to $7\pi$.

FIG. 6 also shows (dashed curve) the energy contained in both the Stokes and anti-Stokes pulse trains (expressed as a percentage of the input cw signal energy) as a function of the phase modulation amplitude A. The energy in the pulse trains varies from 90% to 45% as the modulation amplitude A increases from $\pi$ to $7\pi$. It should be noted that the peak intensity of the generated pulses is 1.7 times higher than the input cw signal intensity (see FIGS. 4-5).

The spectral separation between the Stokes and anti-Stokes pulse trains increases with the phase modulation amplitude A, since the mean frequencies of the two pulse trains correspond closely to the extrema of the instantaneous optical frequency created by the phase modulation. Consequently, the difference between the mean, or carrier frequencies of the pulse trains can be estimated from Eq. (2):

$$\Delta\omega \approx \delta\omega(\Omega t = 0) - \delta\omega(\Omega t = \pi) = 2A\Omega \quad (3)$$

A more accurate expression for the difference between the carrier frequencies of the pulse trains as obtained from numerical simulations shows that:

$$\Delta\omega \approx 1.924(A - 0.9) \cdot \Omega \quad (4)$$

Eq. 4 provides a very good approximation of $\Delta\omega$ for a modulation amplitude A equal to $\pi - 7\pi$.

The following numerical example will further illustrate the features of this invention. If the phase modulator 4 imparts a phase modulation to the cw signal of 10 GHz with an amplitude A equal to $1.9\pi$, two high-quality 10 GHz trains with 19 psec pulses are generated. The spectral separation between the trains is $\Delta\omega/(2\pi) = 97$ GHz. (The corresponding separation in the wavelength domain $\Delta\lambda$ is 0.78 nm at $\lambda = 1550$ nm). In this example, the pulse trains contain 77% of the input cw laser energy. A source of optical pulses such as set forth in this example could be advantageously employed in a WDM long-distance soliton transmission system.

Figure 7A:
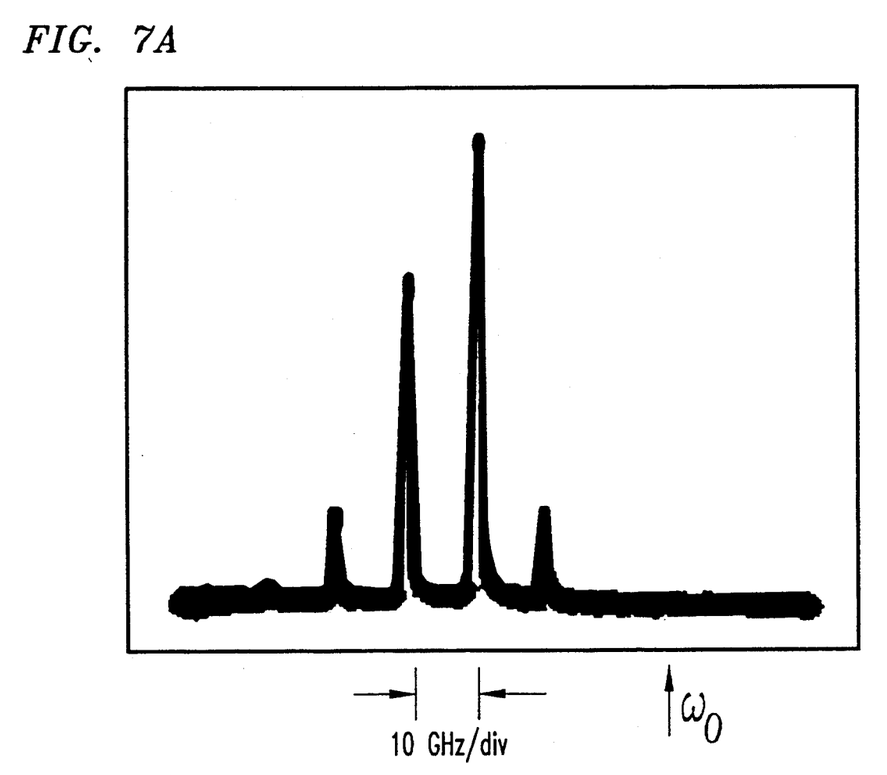
FIG. 7(a) shows an example of the low-frequency spectral components for a phase modulation frequency equal to 10 GHz.
Figure 7B:
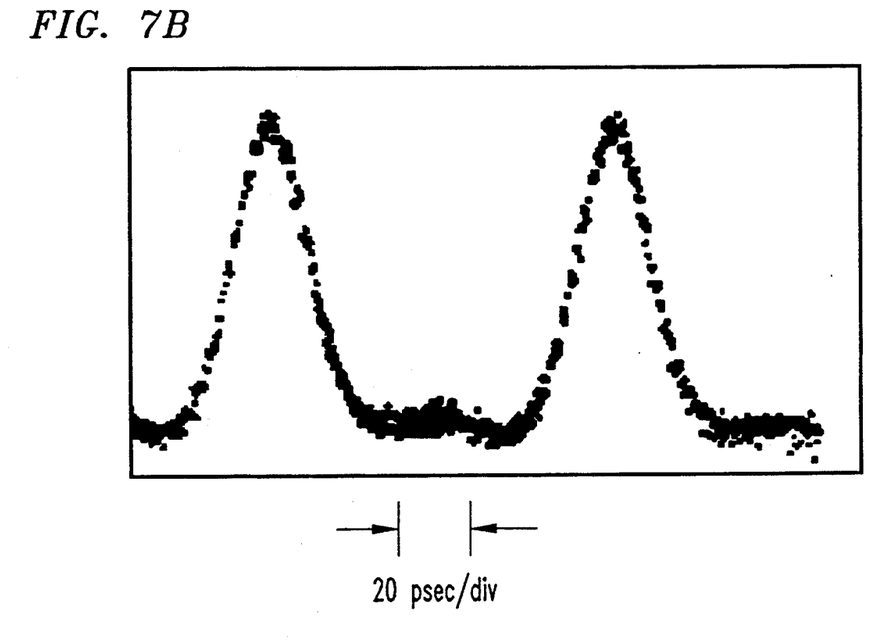
FIG. 7(b) is an oscilloscope trace of the 10 GHz pulse train corresponding to the spectrum of FIG. 7(a).

In one particular embodiment of the invention, a single-frequency cw semiconductor laser is employed which produces a signal at $\lambda = 1560$ nm. The signal is phase modulated by a sinusoidally driven $LiNbO_3$ phase modulator. The modulation frequency is tunable over a range between 2.5–15 GHz. A phase modulation amplitude A approximately equal to $1.5\pi$ is obtained by applying 32 dBm of rf power to the modulator. The low-frequency components of the phase-modulated signal can be selected by using a low-pass fiber grating filter such as disclosed, for example, in V. Mizrahi, J. E. Sipe, "Optical Properties of Photosensitive Fiber Phase Grating", *IEEE J. Lightwave Technology,* 1993. FIG. 6(a) shows the resulting low-frequency spectrum when the modulation frequency is equal to 10 GHz. FIG. 6(b) shows an oscilloscope trace of the 10 GHz pulse train corresponding to the spectrum of FIG. 6(a). The pulse width is 21 psec (obtained after deconvolution of the detection system response of 12 psec), which is in good agreement with numerical calculations. Similar results can be obtained at repetition rates of 2.5–12.6 GHz.

In an alternative example of the invention, the optical filters 6 and 8 may be replaced by a single filter that suppresses the central region of the spectrum (i.e., the carrier signal and possibly one or more pairs of the nearest side-bands). In this case, of course, further spectral selection is required to separate the two pulse trains from one another. This arrangement is advantageous because pulse formation and control of the carrier frequency can be accomplished with a single filter element.

I claim:

1. A method of producing an optical pulse train comprising the steps of:
    generating a cw optical signal;
    phase modulating the optical signal; and
    selecting at least one of the Stokes or anti-Stokes components of the optical signal to generate at least one optical pulse train.

2. The method of claim 1 wherein the phase modulating step comprises the step of phase modulating the optical signal with a sinusoidal modulation having a prescribed frequency and amplitude.

3. The method of claim 1 wherein the selecting step comprises the step of selecting both the Stokes and anti-Stokes components to generate two optical pulse trains.

4. An apparatus producing an optical pulse train, comprising: means for generating an optical cw signal; a phase modulator optically coupled to the generating means; and at least one optical filter optically coupled to the phase modulator.

5. The apparatus of claim 4 further comprising: a second optical filter optically coupled to the phase modulator.

6. The apparatus of claim 5 wherein the first and second optical filters are configured to transmit, respectively, Stokes and anti-Stokes components of a phase modulated signal directed from the phase modulator.

7. The apparatus of claim 4 wherein the first filter is configured to filter out a carrier frequency of a signal phase modulated by the phase modulator.

8. The apparatus of claim 7 wherein the first filter is configured to additionally filter out at least one pair of sidebands.

9. A method of producing two optical pulse trains of differing frequencies, said method comprising the steps of:
    generating a cw optical signal;
    phase modulating the optical signal; and
    removing a carrier frequency of the phase modulated optical signal such that the remaining signal forms two optical pulse trains of differing frequencies.

10. The method of claim 9 further comprising the step of removing at least one pair of sidebands of the phase modulated optical signal.

* * * * *